US008858788B2

(12) United States Patent
De Vocht (10) Patent No.: US 8,858,788 B2
(45) Date of Patent: Oct. 14, 2014

(54) DEVICE FOR THE REMOVAL OF ORGANIC COMPONENTS FROM A MIXTURE OF ORGANIC COMPONENTS AND WATER

(75) Inventor: Kenneth Alexander De Vocht, Antwerp (BE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 514 days.

(21) Appl. No.: 12/936,849

(22) PCT Filed: Apr. 10, 2009

(86) PCT No.: PCT/BE2009/000023
§ 371 (c)(1),
(2), (4) Date: Oct. 7, 2010

(87) PCT Pub. No.: WO2009/127017
PCT Pub. Date: Oct. 22, 2009

(65) Prior Publication Data
US 2011/0024357 A1 Feb. 3, 2011

(30) Foreign Application Priority Data

Apr. 15, 2008 (BE) .................................. 2008/0227
Mar. 17, 2009 (BE) .................................. 2009/0165

(51) Int. Cl.
*C02F 1/28* (2006.01)
*B01J 20/28* (2006.01)
*B01J 20/12* (2006.01)
*B01D 15/00* (2006.01)
*C02F 101/30* (2006.01)
*C02F 101/32* (2006.01)

(52) U.S. Cl.
CPC .................. *C02F 1/286* (2013.01); *C02F 1/288* (2013.01); *B01J 20/2805* (2013.01); *B01J 20/12* (2013.01); *C02F 1/281* (2013.01); *C02F 2209/005* (2013.01); *B01D 15/00* (2013.01); *C02F 2101/30* (2013.01); *C02F 2101/32* (2013.01)
USPC .......... 210/91; 210/202; 210/220; 210/242.4; 210/259; 210/266; 210/274; 210/282; 210/289; 210/484; 210/502.1

(58) Field of Classification Search
USPC ........ 210/680, 91, 202, 220, 242.4, 266, 274, 210/282, 289, 484, 494, 502.1, 494.1, 259
See application file for complete search history.

(56) References Cited

U.S. PATENT DOCUMENTS

| 2,087,157 A | * | 7/1937 | Lind | .................................. 141/2 |
| 2,399,158 A | * | 4/1946 | Armaly | .......................... 210/484 |

(Continued)

FOREIGN PATENT DOCUMENTS

| EP | 1 185 347 B1 | 8/2003 |
| WO | WO 2007066471 A1 * | 6/2007 | ................ C02F 1/44 |

OTHER PUBLICATIONS

International Search Report in PCT/BE2009/000023, Sep. 16, 2009.

(Continued)

*Primary Examiner* — Matthew O Savage
(74) *Attorney, Agent, or Firm* — Bacon & Thomas, PLLC (57) ABSTRACT

Method for the removal of organic components from a mixture of organic components and water, characterized in that it comprises the steps of guiding the mixture through at least one vessel (3) in which has been provided an amount of organoclay (17) in at least one removable casing (18) which is permeable to liquids and gasses but not to organoclay particles, or on a supporting structure (28) from where the organoclay particles cannot come off, such that the amount of organoclay particles is at any time part of a removable entity; and of producing a flow through the aforesaid mixture in this vessel (3) by guiding a flow of gas bubbles through this mixture.

11 Claims, 4 Drawing Sheets

(56) References Cited

U.S. PATENT DOCUMENTS

| | | | |
|---|---|---|---|
| 2,531,427 A | 11/1950 | Hauser | |
| 2,966,506 A | 12/1960 | Jordan | |
| 3,422,185 A | 1/1969 | Kuritzkes | |
| 3,954,612 A * | 5/1976 | Wilkerson | 210/86 |
| 4,007,118 A * | 2/1977 | Ciambrone | 210/760 |
| 4,137,162 A * | 1/1979 | Mohri et al. | 210/661 |
| 4,549,966 A | 10/1985 | Beall | |
| 4,749,496 A * | 6/1988 | Reischl | 210/692 |
| 4,840,734 A * | 6/1989 | Johnson | 210/660 |
| 5,511,904 A * | 4/1996 | Van Egmond | 405/52 |
| 6,132,612 A * | 10/2000 | Bourgeois | 210/282 |
| 6,503,740 B1 | 1/2003 | Alther | |
| 2004/0232057 A1 * | 11/2004 | Orozco et al. | 210/86 |
| 2008/0230483 A1 * | 9/2008 | Fabri | 210/691 |
| 2009/0283465 A1 * | 11/2009 | Nakayama | 210/202 |

OTHER PUBLICATIONS

Alther G R: Organically modified clay removes oil from water:, Waste Management, Elsevier, New Yor, NY, US, vol. 15, No. 8, Jan. 1, 1995, pp. 623-628, XP004068946.

Alther et al.: "Cleaning wastewater: Removing oil from water with organodlays", Filtration and Separation, Elsevier Advanced Technology, Oxford, GB, vol. 45, No. 4, Mar. 26, 2008, p. 22, 24, XP022559325.

Database Compendex [Online], Engineering Information, Inc., New York, NY, US; Apr. 2005, Moazed H et al.: "Removal of oil from water by bentonite organoclay", XP002507403.

Database Compendex [Online], Engineering Information, Inc., New York, NY, US; 2002, Moazed H: "Practical applications of organoclay and organoclay/anthracite mixture for oil removal from industrial wastewaters", XP002507404.

* cited by examiner

DEVICE FOR THE REMOVAL OF ORGANIC COMPONENTS FROM A MIXTURE OF ORGANIC COMPONENTS AND WATER

BACKGROUND OF THE INVENTION

1. Field of the Invention

The present invention concerns a method for the removal of organic components from a mixture of organic components and water, in particular for the removal of oil from an oil in water emulsion.

In particular, the method is meant for the removal of oil from the condensate of an oil-lubricated compressor, but the method concerned by the invention is not restricted thereto.

2. Discussion of the Related Art

It is known that, when two non-mixable liquids such as oil and water are put into contact, one liquid can be distributed in the other one via dispersion without dissolving and forming a homogenous phase. The dispersion of one liquid in the other one is called an emulsion.

In processes whereby water and oil can condense together and/or can be turbulently mixed, such as in an oil-lubricated compressor, an emulsion is often found in the resulting condensate which can survive a long time, especially when the condensate contains substances which can act as emulsifiers or when the oil has a detergent character. The period of time during which the condensate of an oil-lubricated compressor makes contact with the purifying elements of the installation for condensate treatment is often shorter than the "life span" of an induced emulsion (if this life span were measured in a separate vessel). Apart from this induced emulsion, there usually is a separate oil phase as well.

Two basic groups of emulsions are known: water in oil emulsions, in short WO emulsions, and oil in water emulsions or what are called OW emulsions. The present invention can be used in the field of OW emulsions, whereby drops of oil are distributed in a water phase.

Methods are already known whereby a mixture of organic components and water is put in a vessel in which an amount of "organoclay" is present and whereby organic components are sorbed by the "organoclay" and thus removed from the mixture.

By "organoclay" is meant a reaction product of a clay with a quaternary ammonium compound. Examples of organoclays are described among others in U.S. Pat. No. 2,531,427, U.S. Pat. No. 2,966,506 and U.S. Pat. No. 3,422,185.

The application of organoclay for the removal of organic components from a mixture of organic components and water is described for example in U.S. Pat. No. 4,549,966, in which is described a method whereby a mixture of organic components and water is put into contact with organoclay for a certain period of time so as to allow an amount of the organic components to be sorbed by the organoclay. This contact is induced in a "packed tower", a "fluidized bed" or a "stirred bed".

In a packed tower, the organoclay particles practically stay in the same place whereby, in a continuous process, an OW emulsion flows along. A packed tower has been designed such that no other flow is possible than in one direction through the structure with solid matter, whereby the latter covers the entire section. The design must then allow for an optimal ratio between the pressure drop and the contact time.

In a fluidized bed or stirred bed arrangement, the organoclay particles are set in motion by a gas flow, by a mechanical agitator respectively, and they are maintained in suspension through an OW emulsion.

A first disadvantage of the existing method whereby organoclay in a packed tower is used, is that the OW emulsion must stay relatively long in contact with the organoclay in order to obtain good separation results. This can be explained in that the organic components are surrounded by water molecules which hinder the sorption. A packed tower must then be made relatively large or complex (e.g. with recirculation) to make it possible for a continuous flow to be purified sufficiently.

The major disadvantage of a packed tower, however, is the pressure drop. At the start it is still relatively small and the OW emulsion still flows through smoothly. After having absorbed organic components, practically all organoclays have the property to swell and to thus hamper the flow-through. Since a packed tower has been designed to guarantee the contact between the OW emulsion and the organoclay over the entire cross section, there is no space for cross expansion of the organoclay, and so the latter will easily clog gradually during the process.

Further, packed tower arrangements have been designed such that the supplied flow, in this case the emulsion, only touches one surface of the solid structure, in this case the organoclay, and can reach the entire structure via this surface.

Another disadvantage is a that it is difficult to introduce new organoclay and to remove saturated organoclay. A fluidized bed or a stirred bed is usually applied in batches, and thus it is not very appropriate for continuous processes, unless a complex automation is introduced. As mentioned in U.S. Pat. No. 4,549,966, the organoclay must be filtered, centrifuged or flocculated to be separated from the OW emulsion again.

Fluidized or stirred bed arrangements have a bad reputation in that the particles that are put in suspension wear out under the influence of the agitation. This results in a continuous creation of organoclay particles with diameters that are too small to be collected in a filter. Downstream of this type of arrangements, a cyclone separator is usually installed to separate the worn-out small particles of organoclay.

Another known method for separating oil and water from a mixture thereof consists in leading the mixture of oil and water through a chamber in which has been provided a filter of oleophilous (oil-attracting) material, such that oil can be adsorbed from the liquid mixture of oil and water. An example of such a floating filter is described in EP 1,185,347, the complete description of which has been enclosed here by way of reference.

Although, in general, such filters produce good results, it may be that, under circumstances such as those whereby an emulsion is being formed, such a floating filter, even combined with an after treatment with an active carbon filter and/or combined with a coalescent organ, sometimes is not sufficient to obtain sufficiently purified water. For, the life of the induced emulsion sometimes lasts longer than the contact time with the purifying organs, whereby these purifying organs have not been specifically designed to absorb the distributed oil drops from an OW emulsion.

SUMMARY OF THE INVENTION

The present invention aims to remedy one or several of the above-mentioned disadvantages.

To this end, the invention concerns a method for the removal of organic components from a mixture of organic components and water, this method comprising the steps of:

guiding the mixture through at least one vessel in which has been provided an amount of organoclay in at least one removable casing which is permeable to liquids and gasses but not to organoclay particles, or on a supporting structure from where the organoclay particles cannot come off, such that the amount of organoclay particles are at any time part of a removable entity; and of producing a flow in the mixture in said vessel, said flow in the mixture being produced by guiding a flow of gas bubbles through this mixture.

Tests have proven that the simultaneous combination of putting for example an OW emulsion into contact with organoclay, and producing a flow through the OW emulsion, for example by means of a flow of gas bubbles such as air which is sent through said OW emulsion, whereby the air preferably makes at least partly contact with the organoclay, produces considerably better and faster results as far as separation of oil from the OW emulsion is concerned than the conventional methods which make use for example of a packed tower arrangement.

Moreover, an advantage is obtained compared to the fluidized bed and stirred bed arrangements in that the organoclay particles are held for example inside a casing or are bound to a supporting structure. Said casing or supporting structure can, as opposed to the known above-mentioned arrangements, at all times be easily removed from the treatment vessel to thus simplify the removal or replacement of the organoclay.

In the case of a casing, this casing is formed of a material, for example in the shape of a membrane, which is permeable to liquid and gas, but which prevents organoclay particles from escaping from said casing. The contact surface may be enlarged for example by providing said casing for the organoclay with a smaller section and in a rumpled-up way inside an external casing which is permeable to liquid and gas as well. In this way is created a larger casing/contact surface via which the mixture can reach the organoclay particles.

If the organoclay is provided to an aforesaid supporting structure, it is also made sure that the organoclay particles cannot come off.

The step of introducing and separating the organoclay from the mixture of organic components and water is now facilitated by means of a removable casing or supporting structure, whereby a continuous process does not need to be interrupted. Moreover, the organoclay particles are not subject to wear, as they are not agitated as in a stirred bed or fluidized bed arrangement.

The method according to the invention also promotes the transport phenomenon between organoclay and the organic components in the mixture, but in a manner which is opposite to that of the fluidized bed arrangement. With the method suggested here, the organoclay particles can remain practically in the same place, whereas the flow which induces the flow of gas bubbles constantly supplies non-sorbed organic components via all the surfaces of the organoclay structure. This also provides a considerable time advantage compared to the packed tower arrangement, and it moreover prevents the problem of clogging and a gradually increasing pressure drop.

If one were to make a horizontal section of said vessel at the height of the organoclay, there would be space which is not entirely filled with organoclay. However, the mixture of organic components and water is prevented from taking a bypass this way thanks to a good embodiment of the gassing system which takes the mixture back to recirculate.

According to a preferred characteristic of the invention, the flow of gas bubbles is supplied into the vessel with organoclay via a gas supply provided at the bottom of the vessel concerned, preferably such that the gas is at least partly injected under the above-mentioned amount of organoclay.

This is advantageous in that the gas bubbles rise through the bulk of the mixture of organic components and water and also flow, during the rising motion, via the amount of organoclay, as a result of which the sorbing effect of the organoclay is reinforced. This is obtained thanks to a constant renewal of the contact layer between the organoclay and the mixture and/or by preventing any deposition on the casing wall which might prevent the migration to the organoclay. Thus, a considerably better separation of organic components from the mixture is obtained.

Thus, the invention preferably combines a forced entry of liquid inside the casing or around the supporting structure with organoclay particles, and a deliberate choice of the embodiment of the casing or the supporting structure so as to create efficient access paths offering said liquid a large surface to get into contact with the organoclay particles.

In the simplest application, said access paths are created by not pressing the casing against the wall of the vessel, but by leaving sufficient play between the casing and the vessel.

In order to increase the efficiency, one could say that, as opposed to an entirely convex casing, a surface enlargement can already be obtained as soon as the casing in the vessel is provided with one concave part. If there are several casings, this requirement no longer applies, since the required interspaces may be created here by not pressing the separate casings against one another, for example.

The preferred method for leaving space between the collections of organoclay particles is a clear point of difference with a packed bed arrangement where every space which is not filled with the agitating material is regarded as inefficient.

When applying this method to the treatment of condensate coming from a compressor, a small leak-off air flow is preferably branched off the compressed air created by said compressor. Said leak-off air flow can then be injected in the treatment vessel with organoclay.

An additional advantage of the injection of air concerns the breakdown of anaerobic bacteria, which are easily formed in a sealed packed tower with organic components.

The agitation caused in the emulsion by the air supply not only speeds up the diffusion process but also increases the chance for the binding between the oil particles and the water particles in the oil/water complexes to break, as well as the mutual binding between the oil/water complexes.

Preferably, before the mixture of organic components and water is put in the vessel with organoclay concerned, the mixture is put in a pre-treatment vessel via an inlet situated above an outlet, such that the mixture is forced to move downward through and in contact with a separation organ in the pre-treatment vessel, which separation organ comprises a material which adsorbs or absorbs organic components and which method further makes sure that water which has been separated in the pre-treatment vessel is discharged from this pre-treatment vessel via the outlet, whereby the separation organ is fit to move down in the pre-treatment vessel in response to an increase in weight thereof when organic components are adsorbed or absorbed by the latter, which mixture will be introduced in the pre-treatment vessel until the separation organ is saturated, as a result of which the separation organ sinks into a lower position in the vessel and, in case of complete saturation, drops on the bottom of the vessel.

The use of such a pre-treatment vessel makes it possible to carry out a first, efficient separation of the organic components and the water, as a result of which the life of the organoclay in the vessel increases, such that it will have to be replaced less, which results in cost savings and a restriction in time of the amount of waste.

Preferably, the method according to the invention also comprises the step, after treating the mixture of organic components and water in the vessel with organoclay, of putting the separated water containing a residual fraction of organic components in a post treatment vessel to be filtered by means of a filter provided in this post treatment vessel, preferably in the form of an active carbon filter.

The advantage of using such a post treatment vessel is that the residual fraction of organic components such as oil particles which might still be present in the separated water can be filtered out of this water. Since the mixture of organic components and water has already been broken in the vessel with organoclay, the life of the filter in the post treatment vessel is increased, and it is also made sure that the pores of such a filter cannot or can hardly be clogged, such that a long-lasting and efficient operation is maintained.

The invention also concerns a device for the removal of organic components from a mixture of organic components and water, whereby this device is provided with a vessel with an inlet for a mixture of organic components and water and an outlet to discharge the treated mixture, and whereby an amount of organoclay has been provided in this vessel, whereby the invention is characteristic in that the above-mentioned amount of organoclay is provided in at least one removable casing which is permeable to liquids and gasses but not to organoclay particles, or on a supporting structure from where the organoclay particles cannot come off, such that the amount of organoclay particles at any time form part of a removable entity; and in that the vessel containing organoclay is further provided with means to produce a flow in the mixture in the vessel, said means for producing a gas flow in the mixture in the vessel comprising a gas supply to guide a flow of gas bubbles through the mixture.

According to a preferred characteristic of the invention, the above-mentioned at least one casing is provided in a removable external casing which is permeable to liquids and gasses.

According to a preferred characteristic of the invention, the above-mentioned gas supply is formed of a branch of the compressed air of a compressor.

BRIEF DESCRIPTION OF THE DRAWINGS

In order to better explain the characteristics of the invention, the following method according to the invention for the removal of organic components from a mixture of organic components and water and a device to carry out said method are described by way of example only, without being limitative in any way, with reference to the accompanying drawings, in which.

DESCRIPTION OF SOME PREFERRED EMBODIMENTS

Figure 1:
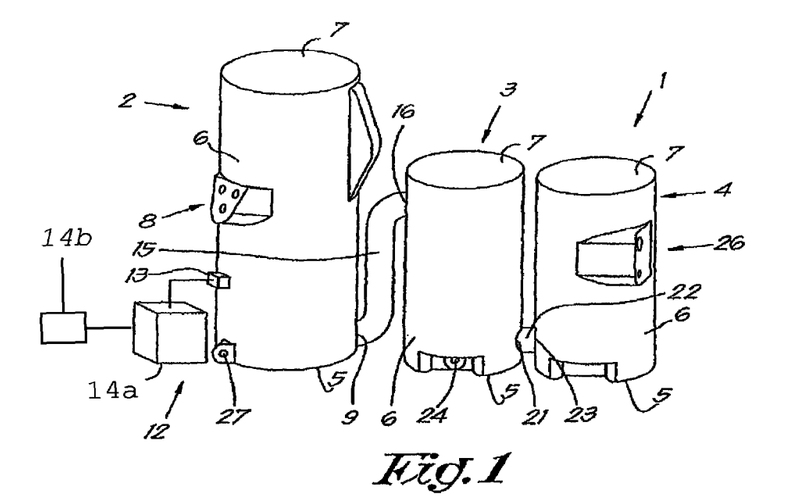
FIG. 1 schematically represents a device according to the invention, seen in perspective.
Figure 2:
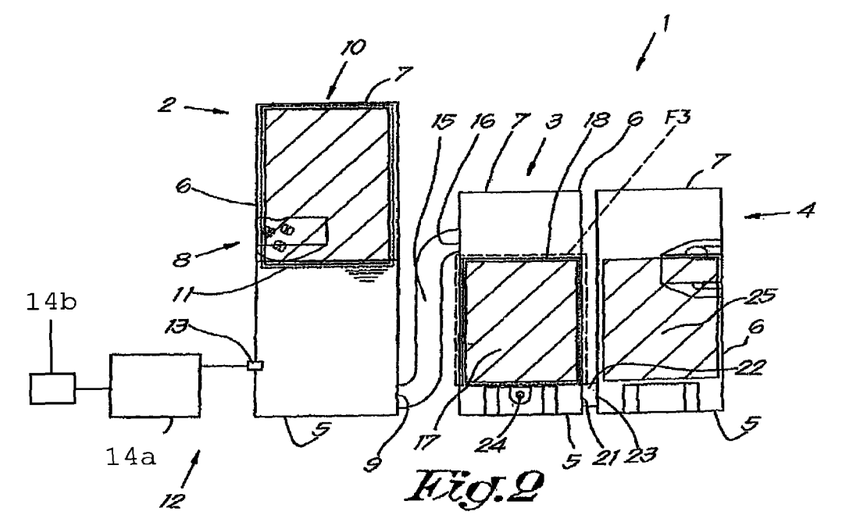
FIG. 2 shows a longitudinal section of a device according to FIG. 1.

The device 1 in this case comprises three connected vessels, a pre-treatment vessel 2, a middle vessel 3 and a post treatment vessel 4 respectively.

Each of the above-mentioned vessels 2, 3 and 4 in this case consists of a bottom wall 5, a cylindrical side wall 6 and a preferably removable upper wall 7.

The pre-treatment vessel 2 is made in a manner which is practically known as such, in the form as described in EP 1,185,347, and it comprises an inlet 8 provided in the side wall 6 for a mixture of organic components and water, and an outlet 9 through which separated water can be discharged during use.

In this example, which will be further illustrated hereafter, it will be assumed for simplicity's sake that the mixture of organic components and water consists of a mixture of a coolant and/or a lubricant with water, and in particular of an OW emulsion. Naturally, the invention is not limited thereto and it also comprises applications whereby other organic components than coolants and/or lubricants such as oil are removed from a mixture of such organic components and water.

The inlet 8 of the pre-treatment vessel 2 is placed above the outlet 9, which implies that the inlet 8 is situated at a higher level than the outlet 9 or, in other words, that the inlet is situated closer to the upper wall, whereas the outlet 9 is situated closer to the bottom wall.

Inside the pre-treatment vessel 2 is further provided a separation organ 10, which separation organ 10 is in this example made in the form of a sack 11 in which an oleophilous (oil-attracting) material has been provided, such as for example a blown fusible polymer.

As is known, the separation organ 10 is made such that, in response to an increase in weight thereof, when liquid oil is adsorbed or absorbed, it can move down in the pre-treatment vessel 2.

The above-mentioned sack 11 generally has a loose fit in the pre-treatment vessel 2 and has such a floating power that the sack 11 will float in the pre-treatment vessel 2. Preferably, means can moreover be provided which increase the floating power of the sack 11, for example in the form of a float, not represented in the figures, made of an expanded synthetic which cannot be moisturized, such as polystyrene.

As is known, the above-mentioned sack 11 can be made for example in the shape of any type of perforated or porous holder in the shape of a net or the like.

Further, the above-mentioned pre-treatment vessel 2 is preferably but not necessarily provided with indication means 12 which indicate when the separation organ is saturated with oil, whereby these indication means 12 are made for example in the shape of at least one position sensor 13 which is connected to a controller 14a and signalling means 14b.

The outlet 9 of the pre-treatment vessel 2 is connected, via a first connecting line 15, to an inlet 16 of the middle vessel 3, which is provided to supply a mixture of organic components and water, and in the present example an oil in water emulsion coming from the pre-treatment vessel 2, and whereby this inlet 16 is preferably but not necessarily provided near the top side of the vessel 3.

In the vessel 3 has been provided an amount of organoclay 17, i.e. a reaction product of a clay such as montmorillonite or bentonite, having a quaternary ammonium compound.

Naturally, any type of organoclay 17 can be used, known to any expert in the field, for example as described in U.S. Pat. No. 2,531,427, U.S. Pat. No. 2,966,506 and U.S. Pat. No. 3,422,185.

According to the invention, for example the above-mentioned amount of organoclay 17 has been provided in at least one removable casing 18 which is permeable to liquids and gasses but not to organoclay particles, such that the flow-through of the mixture of organic components and water, i.e. in the present example of the OW emulsion, is made possible.

In this case, two removable casings 18 are provided, in this case one on top of the other.

Figure 3:
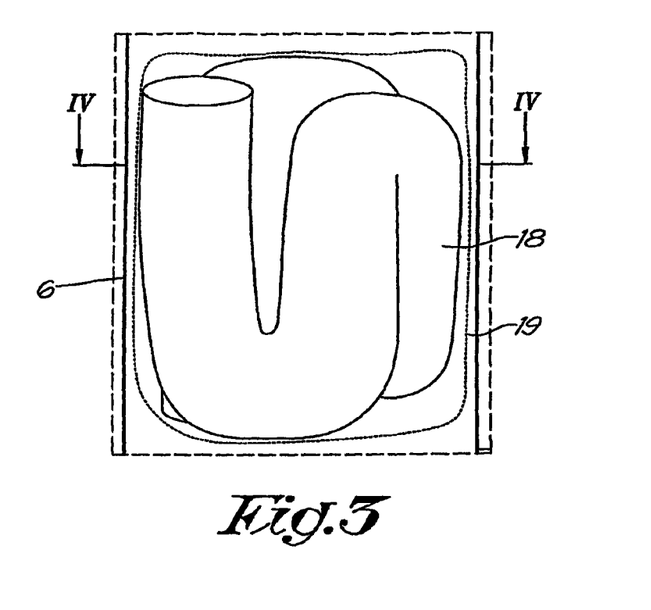
FIG. 3 schematically represents the part indicated by F3 in FIG. 2, but to a larger scale.
Figure 4:
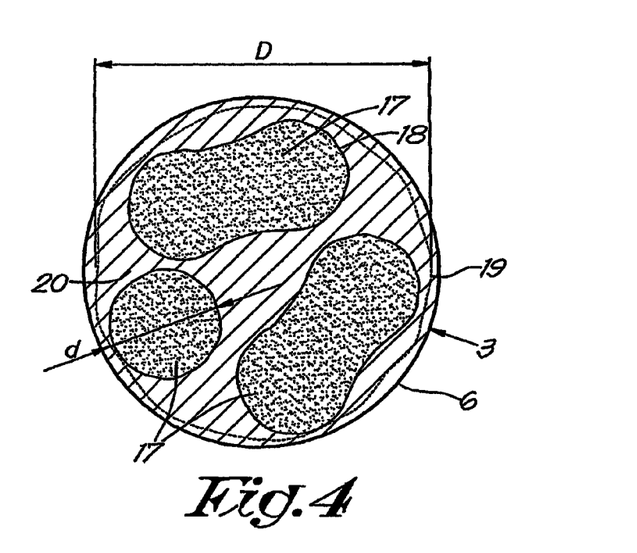
FIG. 4 is a section according to line IV-IV in FIG. 3.

In order to maximize the contact surface, the above-mentioned casing 18, as is represented in more detail in FIGS. 3 and 4, can be made for example in the shape of a longitudinal sack which is in this case sealed on either side and in which the above-mentioned amount of organoclay has been provided, which casing 18 is rumpled up inside an external casing 19, for example in the shape of a net which is permeable to liquid and gas as well. By "rumpled up" is meant here any form of folding, pleating or gathering the casing 18, such as pleating in a zigzag pattern, rolling up or the like.

To this end, the above-mentioned sack preferably has a section which is smaller than the section of the external casing 19, as this sack has a diameter d in its cross section which is smaller than the diameter D of the external casing 19.

In the vessel 3, and in this case between the above-mentioned amount of organoclay 17 and the wall 6 of the vessel 3, and between the contact surfaces 18 of the casing, a space 20 is provided according to a preferred characteristic of the invention which allows the organoclay to swell and which also makes sure that the supplied mixture can penetrate the casing 18 via all external and internally created surfaces.

The middle vessel 3 is further provided with an outlet 21 to discharge the treated mixture, which outlet 21 is in this case provided near the bottom wall 5 of said vessel 3 and which connects, via a second connecting line 22, to an inlet 23 of the post treatment vessel 4.

According to the invention, the vessel 3 with organoclay 14 is provided with means to produce a flow in the mixture, which means preferably comprise a gas supply 24 which makes it possible to send a flow of gas bubbles, in particular air, through the oil in water emulsion, whereby said gas supply 24, according to a preferred characteristic of the invention, is provided in a place where gas bubbles are forced to make contact with the organoclay 17, in this case on the bottom side of the above-mentioned vessel 3 with organoclay 17, in particular at least partly under the above-mentioned amount of organoclay 17.

According to a specific characteristic of the invention, the above-mentioned gas supply 24 can for example be formed by branching the compressed air of a compressor.

In the post treatment vessel 4 is in this example provided a filter 25 which may consist for example of an active carbon filter.

Finally, the post treatment vessel 4 is further provided with an outlet 26 for separated water, from which the organic components such as oil have been practically entirely removed, which outlet 26 is in this case provided practically at the top of the post treatment vessel 4 or at least partly above the above-mentioned filter 25.

Preferably but not necessarily, each of the above-mentioned vessels 2 and 3 is provided with a drainage opening 27 near the bottom wall 5 to simplify the maintenance of the vessels 2, 3 and 4. Naturally, also the above-mentioned opening of the gas supply 24 can be used to this end.

A method according to the invention for the removal of organic components from a mixture of organic components and water, in particular for the removal of coolants and/or lubricants or a mixture thereof with water is very simple and as follows.

Via the inlet 8, a mixture of organic components and water, in this example an oil in water emulsion (OW emulsion) which may consist for example of the condensate of the compressed air of an oil-injected compressor, is put in the pre-treatment vessel 2, in which predominantly free oil is adsorbed or absorbed by getting into contact with the oleophilous material in the sack 11.

The lower density of the oil will have for a result that the oil starts to float at or near the liquid surface in the pre-treatment vessel 2 and thus gets into contact with the oleophilous material of the separation organ 10.

The contact between the OW emulsion and the oleophilous material of the separation organ is optimized, since the inlet 8 is in this case situated above the outlet 9, such that, when the OW emulsion flows from the inlet 8 to the outlet 9, said OW emulsion is forced to make contact with the separation organ 10.

Since the separation organ 10 moves downward in the pre-treatment vessel 2 when the oleophilous material adsorbs the oil, the oleophilous material which is not saturated with oil can, as is known, be continuously present at the surface of the liquid in the pre-treatment vessel 2, where the oil tends to settle.

As soon as the separation organ 10 in the pre-treatment vessel 2 is saturated, as a result of which it moves down into a low position, and whereby the maximal oil volume is adsorbed or absorbed, the separation organ 10, or at least the oleophilous material which is part of this separation organ 10, can be replaced.

According to a special aspect of the invention it is possible to detect, by means of indication means 12 provided to that end which indicate when the separation organ 10 is saturated with oil, when the separation organ 10 needs to be replaced.

The above-mentioned indication means can be realised in many different ways according to the invention, and they have the form of a position sensor 13 in this case which registers the position of the separation organ 10 and which is connected to a controller 14a.

The above-mentioned controller 14a can be connected to signalling means 14b, such as an alarm, a lamp or the like, or to a pc which is connected to the monitor of a control centre or the like.

The OW emulsion which leaves the pre-treatment vessel 2 via the outlet 9 subsequently flows via the first connecting line 15 to the inlet 16 of the middle vessel 3 containing the amount of organoclay 17.

Since the inlet 16 of the vessel 3 has been provided above the outlet 21 of the latter, and the amount of organoclay 17 extends at least partly between said inlet 16 and outlet 21, the mixture which in this example consists of an OW emulsion flows via the organoclay 17. Thanks to the gas supply 24, there is also a recirculation operation in this vessel 3.

Thanks to the presence of a space 20 between the amount of organoclay 17 and the wall 6 of the vessel 3, and between the mutual internally created surfaces, a possible swelling of the organoclay 17, when saturated, does not hinder the flow-through of the mixture, and the supplied mixture can penetrate the organoclay directly via all external and internally created surfaces.

Oil from the OW emulsion is in this case sorbed by said organoclay 17, as the oil binds to the far ends of the amine chains situated at the surface and between the clay layers of the organoclay 17.

According to a specific characteristic of the invention, while the OW emulsion is present in the vessel 3, a flow of gas bubbles such as air is for example sent through the OW emulsion, which provides considerably faster and better results as far as separation of oil from the OW emulsion is concerned than the conventional methods whereby for example no flow of gas bubbles is sent through the OW emulsion.

Since the gas supply 24 is in this case provided at the bottom of the vessel 3 and is situated at least partly under the above-mentioned amount of organoclay 17, it is made sure that an optimal contact is obtained between the rising gas bubbles in the OW emulsion and the organoclay 17, as a result of which the separation is further optimized.

After the oil in water emulsion has been sent through the vessel 3 concerned containing organoclay 17, the water with the remaining oil particles is further treated in the post treatment vessel 4 by means of the filter 25.

Since the OW emulsion has been broken in the vessel 3 in the meantime, one can avoid that the pores of the filter 25, which are made for example in the form of an active carbon filter, might get clogged, as a result of which the life span of the filter 25 increases.

Figure 5:
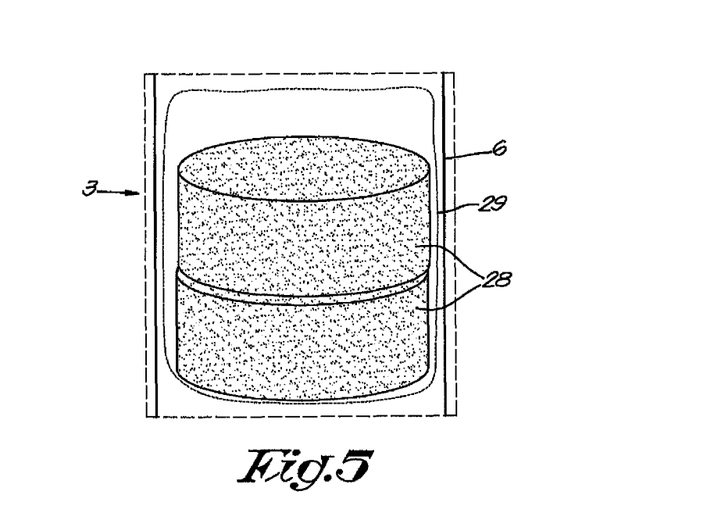
FIG. 5 shows a variant according to FIG. 3.
Figure 7:
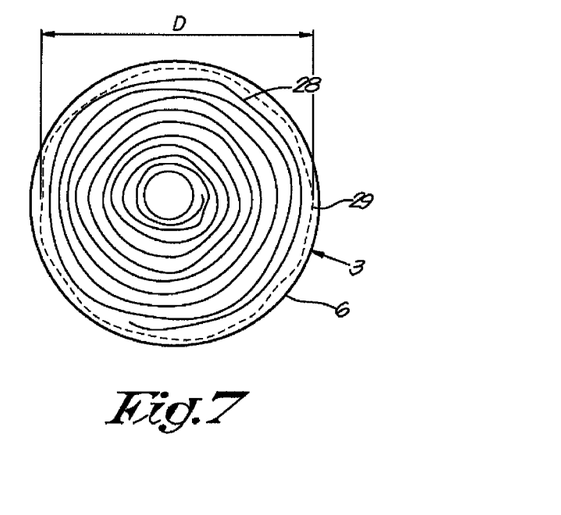

As shown in FIGS. 5 and 7, the amount of organoclay can also be provided onto a supporting structure 28 from where the organoclay particles cannot come off.

Such a supporting structure can for example, as represented in FIG. 5, be made of a material with an open cell structure, such as a synthetic foam or the like, to which the organoclay particles adhere.

In this case, the supporting structure 28 is provided in a casing 29 which is permeable to liquid and gas, but this is not required according to the invention since the organoclay particles are fixed to the structure 28.

The shape of the supporting structure 28 can be realised in any way whatsoever. FIG. 7 shows a preferred variant whereby the supporting structure 28 has the shape of a winding spiral.

In this way, a very large contact surface is obtained between the organoclay and the mixture for a limited space.

Figure 6:
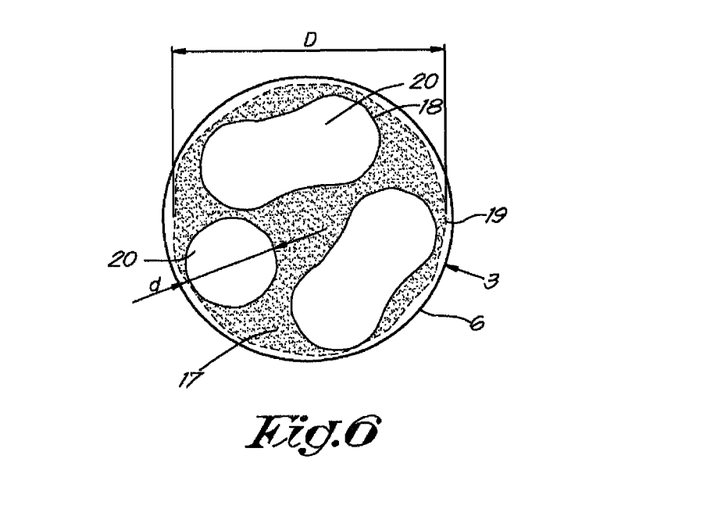
FIGS. 6 and 7 represent variants according to FIG. 4.

FIG. 6 shows yet another embodiment of a vessel 3 with organoclay 17 of a device according to the invention, whereby a casing 18 is provided in this vessel 3 containing organoclay 17, and whereby openings 20 are provided in said casing 18 of the example where there is not any organoclay available. Such openings 20 allow for a possible swelling of the organoclay 17 without thereby hindering the flow in the mixture.

In the above-described examples, air is always used to form the flow of gas bubbles, but the invention is not restricted thereto and it also allows for the use of other gases.

As already mentioned above, the invention is not restricted either to the removal of oil from an OW emulsion or to the removal of coolants and/or lubricants from a mixture thereof with water; on the contrary, the invention can also be applied for the removal of all sorts of organic components from a mixture of organic components and water.

The present invention is by no means restricted to the embodiments described by way of example and represented in the accompanying figures; on the contrary, such a method according to the invention for the removal of organic components from a mixture of organic components and water and a device to carry out such a method can be made in many different ways while still remaining within the scope of the invention.

The invention claimed is:

1. A device for the removal of organic components from a mixture of organic components and water, comprising
    a cylindrical vessel coaxially arranged about a central vertical axis having an inside diameter D, said vessel having an inlet proximate a removable top wall of the vessel for receiving a mixture of organic components and water to be treated and an outlet proximate a bottom wall of the vessel to discharge the treated mixture;
    an amount of organoclay in the vessel;
    said amount of organoclay being provided in a removable casing positioned within the vessel at an elevation between the inlet and the outlet, wherein said removable casing is permeable to liquids and gasses but not to organoclay particles; and
    a flow producer producing a flow in the mixture in the vessel, said flow producer comprising a gas supply, and a gas inlet proximate the bottom wall of the vessel to direct a flow of gas bubbles upwardly through the mixture and organoclay within the vessel;
    wherein the removable casing is made in the shape of a longitudinal sack that has an outside diameter d, a length L, and opposite ends that are closed, wherein the outside diameter d of the longitudinal sack is less than the inside diameter D of the vessel, wherein the longitudinal sack is folded into a generally zigzag pattern along the length L and includes a plurality of generally vertically oriented segments between the folds, wherein the longitudinal sack is positioned inside an external casing which is permeable to liquids and gasses, and wherein the external casing, the longitudinal sack positioned in the external casing, and the amount of organoclay disposed in the longitudinal sack form an entity that is removable from the vessel.

2. The device according to claim 1, wherein said at least one removable casing comprises a single casing containing organoclay, at least one part of which has a concave surface so as to enlarge the accessible surface between the flowing mixture on the one hand and the casing on the other hand during operation of the device.

3. The device according to claim 1, wherein the gas supply comprises a branch of a compressed air line of a compressor.

4. The device according to claim 1, wherein said gas inlet is provided at a location where the flow of gas bubbles is forced to make contact with the organoclay.

5. The device according to claim 1, wherein the gas inlet is at least partly provided under the amount of organoclay.

6. The device according to claim 1, including a pre-treatment vessel having an inlet through which the mixture to be treated is introduced in the pre-treatment vessel and an outlet through which the treated mixture is discharged during the operation, a separation element inside the pre-treatment vessel, which separation element comprises a material which adsorbs organic components, and is configured to move down in the pre-treatment vessel in response to an increase in weight of the latter when liquid organic components are adsorbed or absorbed, said inlet of the pre-treatment vessel being located above the outlet of the pre-treatment vessel, such that the mixture to be treated moves down through the adsorbing or absorbing separation element and, as it flows from the inlet to the outlet of the pre-treatment vessel, is forced to make contact with the separation element.

7. The device according to claim 6, wherein the pre-treatment vessel includes an indicator that indicates when the separation element is saturated with oil.

8. The device according to claim 7, wherein the indicator includes at least one position sensor which is connected to a controller and signaling means.

9. The device according to claim 1, including a post treatment vessel which connects to the outlet of the vessel with organoclay and in which is provided a filter.

10. The device according to claim 9, wherein filter in the post treatment vessel comprises an active carbon filter.

11. The device according to claim 1, including a space in the vessel that enables the supplied mixture to penetrate the casing with organoclay directly via at least all outer surfaces.

* * * * *